United States Patent
Simon et al.

(10) Patent No.: US 12,537,608 B2
(45) Date of Patent: Jan. 27, 2026

(54) METHOD OF ERROR VECTOR MAGNITUDE (EVM) MINIMIZATION FOR A RADIO FREQUENCY (RF) MEASUREMENT EQUIPMENT, AND RF MEASUREMENT EQUIPMENT

(71) Applicant: Rohde & Schwarz GmbH & Co. KG, Munich (DE)

(72) Inventors: Martin Simon, Otterfing (DE); Alexander Dorer, Augsburg (DE)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 683 days.

(21) Appl. No.: 17/889,923

(22) Filed: Aug. 17, 2022

(65) Prior Publication Data

US 2024/0063921 A1 Feb. 22, 2024

(51) Int. Cl.
 *H04B 17/00* (2015.01)
 *H04B 17/29* (2015.01)

(52) U.S. Cl.
 CPC ......... *H04B 17/0085* (2013.01); *H04B 17/29* (2015.01)

(58) Field of Classification Search
 CPC .................. H04B 17/0085; H04B 17/29
 See application file for complete search history.

(56) References Cited

U.S. PATENT DOCUMENTS

| | | | | |
|---|---|---|---|---|
| 8,565,343 | B1 * | 10/2013 | Husted | H04B 1/0475 |
| | | | | 455/114.3 |
| 9,107,172 | B1 * | 8/2015 | Epstein | H04B 1/1027 |
| 9,337,782 | B1 * | 5/2016 | Mauer | H04L 25/03343 |
| 9,461,697 | B2 * | 10/2016 | Yu | H04B 15/00 |
| 9,813,190 | B1 * | 11/2017 | Sutskover | H03F 1/3247 |
| 9,876,515 | B2 * | 1/2018 | Koskinen | H03F 3/24 |
| 10,181,823 | B1 * | 1/2019 | Cheng | H03F 1/30 |
| 10,298,247 | B1 * | 5/2019 | Frew | H03M 1/0624 |
| 11,323,143 | B1 * | 5/2022 | Tong | H04B 1/04 |
| 11,368,175 | B2 * | 6/2022 | Jimenez | H04B 1/04 |
| 11,543,277 | B2 * | 1/2023 | Wilhelm | G01D 21/00 |
| 11,893,160 | B2 * | 2/2024 | Tran | G08G 5/21 |
| 12,081,248 | B2 * | 9/2024 | Abotabl | H04B 1/0475 |
| 12,197,178 | B2 * | 1/2025 | Tran | G06N 3/088 |
| 2007/0015474 | A1 * | 1/2007 | Heinikoski | H03F 1/3241 |
| | | | | 455/114.3 |
| 2008/0144707 | A1 * | 6/2008 | Tsfati | H04B 17/13 |
| | | | | 455/127.2 |

(Continued)

FOREIGN PATENT DOCUMENTS

WO 2022066161 A1 3/2022

*Primary Examiner* — Dominic E Rego
(74) *Attorney, Agent, or Firm* — DITTHAVONG, STEINER & MLOTKOWSKI (57) ABSTRACT

A method of error vector magnitude, EVM, minimization for a radio frequency, RF, measurement equipment is provided. The method comprises: measuring the EVM of a receive, RX, chain of the RF measurement equipment in accordance with a transmit, TX, feedback signal; and responsive to a trigger event, actuating one or more power-adjusting members interposed in the RX chain in accordance with the measured EVM of the RX chain. Among others, the RF measurement equipment is thereby consistently operated based on optimal power levels in the RX chain.

20 Claims, 5 Drawing Sheets

(56) References Cited

U.S. PATENT DOCUMENTS

| | | | | |
|---|---|---|---|---|
| 2008/0287076 | A1* | 11/2008 | Shen | H04B 1/0475 |
| | | | | 455/114.3 |
| 2012/0314746 | A1* | 12/2012 | Lorenz | H03G 3/3042 |
| | | | | 375/224 |
| 2013/0045772 | A1* | 2/2013 | Ohyama | H04W 52/56 |
| | | | | 455/522 |
| 2014/0057684 | A1* | 2/2014 | Khlat | H03F 3/505 |
| | | | | 455/574 |
| 2015/0023445 | A1* | 1/2015 | Camuffo | H04L 25/03 |
| | | | | 375/268 |
| 2015/0358038 | A1* | 12/2015 | Koskinen | H03F 1/02 |
| | | | | 375/297 |
| 2016/0072594 | A1* | 3/2016 | Yuan | H04B 17/21 |
| | | | | 455/424 |
| 2017/0041886 | A1* | 2/2017 | Baker | H04B 10/116 |
| 2017/0187331 | A1* | 6/2017 | Lam | H03F 3/211 |
| 2019/0235571 | A1* | 8/2019 | Jang | H01Q 1/243 |
| 2019/0302818 | A1* | 10/2019 | Liu | H02M 3/156 |
| 2019/0356397 | A1* | 11/2019 | DaSilva | G01R 1/045 |
| 2020/0187127 | A1* | 6/2020 | Mofidi | H04W 52/50 |
| 2020/0204420 | A1* | 6/2020 | Megretski | H04L 27/2614 |
| 2020/0311204 | A1* | 10/2020 | Gupta | G06N 3/006 |
| 2020/0364187 | A1* | 11/2020 | Tran | G06N 3/02 |
| 2020/0374996 | A1* | 11/2020 | Barnes | H05B 47/196 |
| 2021/0029795 | A1* | 1/2021 | Chaturvedi | G06F 3/04842 |
| 2021/0090962 | A1* | 3/2021 | Kapoor | H01L 21/67253 |
| 2021/0099329 | A1* | 4/2021 | Hellfajer | H04L 27/2657 |
| 2021/0176657 | A1* | 6/2021 | Yang | H04L 5/0007 |
| 2021/0305945 | A1* | 9/2021 | Pratt | H04B 1/0475 |
| 2021/0307137 | A1* | 9/2021 | Bhutani | H05B 45/12 |
| 2021/0357111 | A1* | 11/2021 | Alfonzo | H05B 45/20 |
| 2022/0248344 | A1* | 8/2022 | Kalavakuru | H04W 52/242 |
| 2022/0342373 | A1* | 10/2022 | Ho | H05B 47/196 |
| 2023/0014042 | A1* | 1/2023 | Barak | H04L 5/0048 |
| 2023/0102955 | A1* | 3/2023 | Aparin | H04B 1/62 |
| | | | | 375/297 |
| 2023/0111606 | A1* | 4/2023 | He | G06N 3/0499 |
| | | | | 455/114.3 |

* cited by examiner

METHOD OF ERROR VECTOR MAGNITUDE (EVM) MINIMIZATION FOR A RADIO FREQUENCY (RF) MEASUREMENT EQUIPMENT, AND RF MEASUREMENT EQUIPMENT

TECHNICAL FIELD

The present disclosure relates to RF measurement technology, and in particular, to a method of EVM minimization for an RF measurement equipment, and to an RF measurement equipment.

BACKGROUND ART

Communication test equipment typically comprises receive (RX) and transmit (TX) chains. A competitivity of such a communication tester is indicated, most importantly, by its EVM, a measure of a deviation of received symbols of a communication signal from an ideal symbol constellation. EVM is normally dominated by thermal noise (SNR) for low signal power and by nonlinear distortions (IMD3) for high signal power. EVM minimization requires an optimization of power levels along the respective RX/TX chain over a wide dynamic range by interposed adjustable attenuators and/or adjustable amplifiers.

Conventionally, optimum power levels along the respective RX/TX chain are predicted in accordance with data sheets or measurements, and any variations due to component/production tolerances are determined and saved in the communication tester during production. Still, a self-optimization of the communication tester may take several hours and may not be carried out during ongoing operations. Temperature variations of power amplification are compensated for arithmetically by a correction factor. The adjustment of the input and output power levels of the respective RX/TX chain for the EVM measurement tends to be cumbersome.

SUMMARY

In view of the above-mentioned drawbacks and limitations, the present disclosure aims to improve the EVM optimization of the background art.

This is achieved by the embodiments as defined by the appended independent claims. Preferred embodiments are set forth in the dependent claims and in the following description and drawings.

A first aspect of the present disclosure relates to a method of error vector magnitude, EVM, minimization for a radio frequency, RF, measurement equipment. The method comprises: measuring the EVM of a receive, RX, chain of the RF measurement equipment in accordance with a transmit, TX, feedback signal; and responsive to a trigger event, actuating one or more power-adjusting members interposed in the RX chain in accordance with the measured EVM of the RX chain.

Measuring the EVM of the RX chain of the RF measurement equipment in accordance with the TX feedback signal may comprise continuously measuring the EVM of the RX chain of the RF measurement equipment in accordance with the TX feedback signal.

Measuring the EVM of the RX chain of the RF measurement equipment in accordance with the TX feedback signal may comprise tapping the TX feedback signal from an arbitrary waveform generator, AWG, of a digital-analog converter, DAC, of a transmit, TX, chain of the RF measurement equipment.

Measuring the EVM of the RX chain of the RF measurement equipment in accordance with the TX feedback signal may comprise generating the TX feedback signal by a standalone AWG.

The trigger event may comprise an actuation of a user-operable control element of the RF measurement equipment.

Actuating the one or more power-adjusting members interposed in the RX chain in accordance with the measured EVM of the RX chain may comprise optimizing the measured EVM of the RX chain in accordance with an iterative optimization technique.

Actuating the one or more power-adjusting members interposed in the RX chain in accordance with the measured EVM of the RX chain may comprise optimizing the measured EVM of the RX chain in accordance with a machine learning technique.

The method may further comprise: measuring the EVM of the TX chain of the RF measurement equipment in accordance with an RX feedback signal; and responsive to the trigger event, actuating one or more further power-adjusting members interposed in the TX chain in accordance with the measured EVM of the TX chain.

The power-adjusting members may comprise one or more of: an adjustable attenuator; and an adjustable amplifier.

A second aspect of the present disclosure relates to a radio-frequency, RF, measurement equipment, comprising: a receive, RX, chain, comprising one or more interposed power-adjusting members; and a logic device, being configured to measure an error vector magnitude, EVM, of the RX chain in accordance with a transmit, TX, feedback signal; and responsive to a trigger event, to actuate the power-adjusting members in accordance with the measured EVM of the RX chain.

For measuring the EVM of the RX chain in accordance with the TX feedback signal, the logic device may further be configured to continuously measure the EVM of the RX chain in accordance with the TX feedback signal.

For measuring the EVM of the RX chain in accordance with the TX feedback signal, the logic device may further be configured to tap the TX feedback signal from an arbitrary waveform generator, AWG, of a digital-analog converter, DAC, of a TX chain of the RF measurement equipment.

For measuring the EVM of the RX chain in accordance with the TX feedback signal, the logic device may further be configured to generate the TX feedback signal by a standalone AWG.

The RF measurement equipment may further comprise a user-operable control element, being configured to generate the trigger event responsive to an actuation of the same.

For actuating the power-adjusting members in accordance with the measured EVM of the RX chain, the logic device may further be configured to optimize the measured EVM of the RX chain in accordance with an iterative optimization technique.

For actuating the power-adjusting members in accordance with the measured EVM of the RX chain, the logic device may further be configured to optimize the measured EVM of the RX chain in accordance with a machine learning technique.

The RF measurement equipment may further comprise: a TX chain, comprising one or more further interposed power-adjusting members; and a power-coupling element, being configured to provide the TX chain with an RX feedback signal. The logic device may further be configured to measure an EVM of the TX chain in accordance with the RX feedback signal; and responsive to the trigger event, to actuate the further power-adjusting members in accordance with the measured EVM of the TX chain.

The power-coupling element may comprise one of: a power coupler; and a switch.

The power-adjusting members may comprise one or more of: an adjustable attenuator; and an adjustable amplifier. The logic device may comprise one of: a digital signal processor, DSP; a field-programmable gate array, FPGA; and an application-specific integrated circuit, ASIC.

The RX chain may further comprise one or more of: a bandpass filter or preselector; a local oscillator; an analog-digital converter, ADC; and a serial interface between the ADC and the logic device being in accordance with a JESD204 standard, revision B.

Advantageous Effects

The present disclosure provides a method and a corresponding RF measurement equipment which achieve that:
- a better EVM may be specified in data sheets, without hardware modifications,
- users do not have to deal with optimal input/output power levels of the RF measurement equipment,
- the RF measurement equipment is consistently operated based on optimal power levels in the respective RX/TX chain, such that users consistently measure the EVM based on optimal power levels in the respective RX/TX chain, without the requirement to re-calibrate the RF measurement equipment over and over again,
- device-specific subtleties, such as when to use a pre-amplifier of the RF measurement equipment, may be optimized automatically, and
- a usability of the device is improved.

The technical effects and advantages described above in relation with the method of the first aspect equally apply to the RF measurement equipment of the second aspect having corresponding features.

BRIEF DESCRIPTION OF DRAWINGS

The above-described aspects and implementations will now be explained with reference to the accompanying drawings, in which the same or similar reference numerals designate the same or similar elements.

The features of these aspects and implementations may be combined with each other unless specifically stated otherwise.

The drawings are to be regarded as being schematic representations, and elements illustrated in the drawings are not necessarily shown to scale. Rather, the various elements are represented such that their function and general purpose become apparent to those skilled in the art.

DETAILED DESCRIPTIONS OF DRAWINGS

Figure 1:
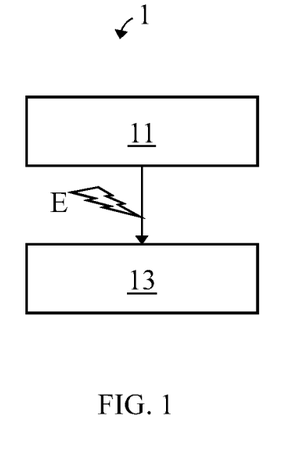
FIG. 1 illustrates a method in accordance with the present disclosure of EVM minimization for an RF measurement equipment.

FIG. 1 illustrates a method 1 in accordance with the present disclosure of EVM minimization for an RF measurement equipment 2.

The method 1 comprises, in this most generic implementation, measuring 11 the error vector magnitude (EVM) of a receive (RX) chain of the radio-frequency (RF) measurement equipment 2 in accordance with a transmit (TX) feedback signal; and actuating 13, responsive to a trigger event E, one or more power-adjusting members 211 interposed in the RX chain 21 in accordance with the measured EVM of the RX chain 21.

An error vector magnitude (EVM) as used herein may refer to a measure of a deviation of received symbols of a communication signal from a reference symbol constellation. The measure is used to quantify the performance of a digital radio transmitter or receiver.

A radio-frequency (RF) measurement equipment as used herein my refer to a communication tester or a spectrum analyzer, for example.

A transmit (TX) feedback signal as used herein may refer to a real or synthetic feedback signal of a TX chain providing the reference symbol constellation for EVM measurement.

The trigger event E may comprise an actuation of a user-operable control element of the RF measurement equipment 2, for example. In other words, the trigger event E may be a keystroke on the RF measurement equipment 2.

In FIG. 1, the trigger event E is suggested by a thunderbolt symbol to indicate that a transition between the measuring 11 and actuating 13 steps requires the stimulus of the trigger event E.

The power-adjusting members 211 may comprise one or more of: an adjustable attenuator; and an adjustable amplifier.

Based on the feedback of a reference symbol constellation (TX feedback signal) to the RX chain 21 and subsequent EVM measurement, the power-adjusting members 211 interposed in the RX chain 21 may automatically be adjusted such that every section of the RX chain 21 is optimized in terms of noise generation and, thus, signal-to-noise ratio (SNR), without unnecessary distortion of the signal by over-driving active circuits such as amplifiers or mixers.

Figure 2:
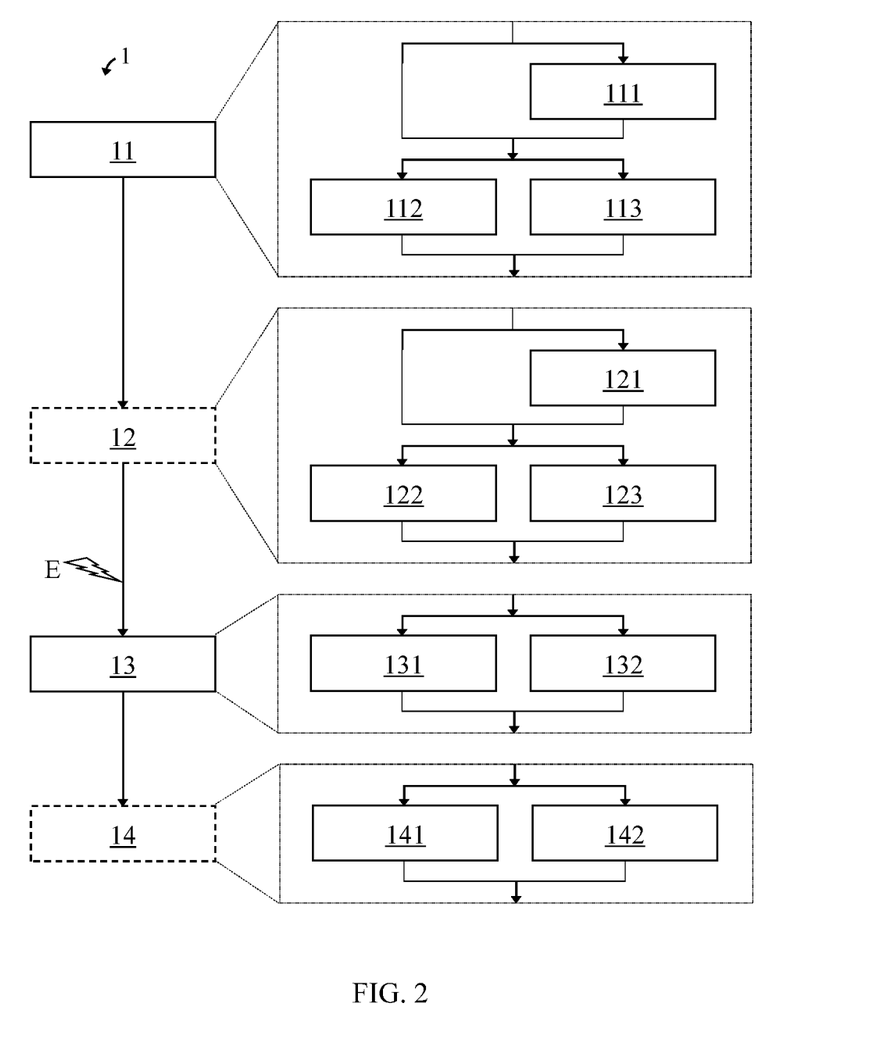
FIG. 2 illustrates the method of FIG. 1 in more detail.

FIG. 2 illustrates the method 1 of FIG. 1 in more detail.

The more detailed implementation of FIG. 2 shows optional steps 12 and 14, indicated by dotted lines, as well as further optional specifics of the steps 11 to 14.

For example, measuring 11 the EVM of the RX chain 21 of the RF measurement equipment 2 in accordance with the TX feedback signal may (or may not) comprise continuously measuring 111 the EVM of the RX chain 21 of the RF measurement equipment 2 in accordance with the TX feedback signal. Thus, an up-to-date EVM value of the RX chain 21 is available whenever the trigger event E occurs.

For example, measuring 11 the EVM of the RX chain 21 of the RF measurement equipment 2 in accordance with the TX feedback signal may comprise tapping 112 the TX feedback signal from an arbitrary waveform generator (AWG) 2441, of a digital-analog converter, DAC 244, of a transmit, TX, chain 24 of the RF measurement equipment 2 or, alternatively, generating 113 the TX feedback signal by a standalone AWG 2442. Thus, the reference symbol constellation for EVM measurement is obtained.

For example, actuating 13 the one or more power-adjusting members 211 interposed in the RX chain 21 in accordance with the measured EVM of the RX chain 21 may comprise optimizing 131 the measured EVM of the RX chain 21 in accordance with an iterative optimization technique; or optimizing 132 the measured EVM of the RX chain 21 in accordance with a machine learning technique. Thus, the measured EVM of the RX chain 21 may be improved in accordance with any iterative optimization technique, such as dynamic programming, generating a sequence of improving approximate solutions, and/or with any machine learning technique, such as training of artificial neural networks, generalizing the labeled solutions of an iterative optimization technique, for example.

As previously mentioned, the method 1 may further comprise measuring 12 the EVM of the TX chain 24, if any, of the RF measurement equipment 2 in accordance with an RX feedback signal.

A receive (RX) feedback signal as used herein may refer to a real or synthetic feedback signal of a RX chain providing the reference symbol constellation for EVM measurement.

Measuring 12 the EVM of the TX chain 24 of the RF measurement equipment 2 in accordance with the RX feedback signal may (or may not) comprise continuously measuring 121 the EVM of the TX chain 24 of the RF measurement equipment 2 in accordance with the RX feedback signal. Thus, an up-to-date EVM value of the TX chain 24 is available whenever the trigger event E occurs, as previously mentioned in connection with step 111.

Measuring 12 the EVM of the TX chain 24 of the RF measurement equipment 2 in accordance with the RX feedback signal may comprise tapping 122 the RX feedback signal from an AWG (not shown) of a DAC 214, of an RX chain 21 of the RF measurement equipment 2 or, alternatively, generating 123 the RX feedback signal by a stand-alone AWG (not shown). Thus, the reference symbol constellation for EVM measurement is obtained as previously mentioned in connection with steps 112 and 113, respectively.

The method 1 may further comprise actuating 14, responsive to the trigger event E, one or more further power-adjusting members 241 interposed in the TX chain 24 in accordance with the measured EVM of the TX chain 24.

Similarly to the RX chain 21, the further power-adjusting members 241 of the TX chain 24 may comprise one or more of: an adjustable attenuator; and an adjustable amplifier.

Actuating 14 the one or more power-adjusting members 241 interposed in the TX chain 24 in accordance with the measured EVM of the TX chain 24 may comprise optimizing 141 the measured EVM of the TX chain 24 in accordance with an iterative optimization technique; or optimizing 142 the measured EVM of the TX chain 24 in accordance with a machine learning technique. Thus, the measured EVM of the TX chain 24 may be improved as previously mentioned in connection with steps 131 and 132, respectively.

Based on the feedback of a reference symbol constellation (RX feedback signal) to the TX chain 24 and subsequent EVM measurement, the power-adjusting members 241 interposed in the TX chain 24 may automatically be adjusted such that every section of the TX chain 24 is optimized in terms of noise generation and, thus, signal-to-noise ratio (SNR), without unnecessary distortion of the signal by over-driving active circuits such as amplifiers or mixers.

As may be taken from FIG. 2, a transition between the measuring 12 and actuating 14 steps also requires the stimulus of the trigger event E. In an overall picture, the measuring steps 11, 12 precede the trigger event E in arbitrary order, and the actuating steps 13, 14 succeed the trigger event E, also in arbitrary order.

Figure 3:
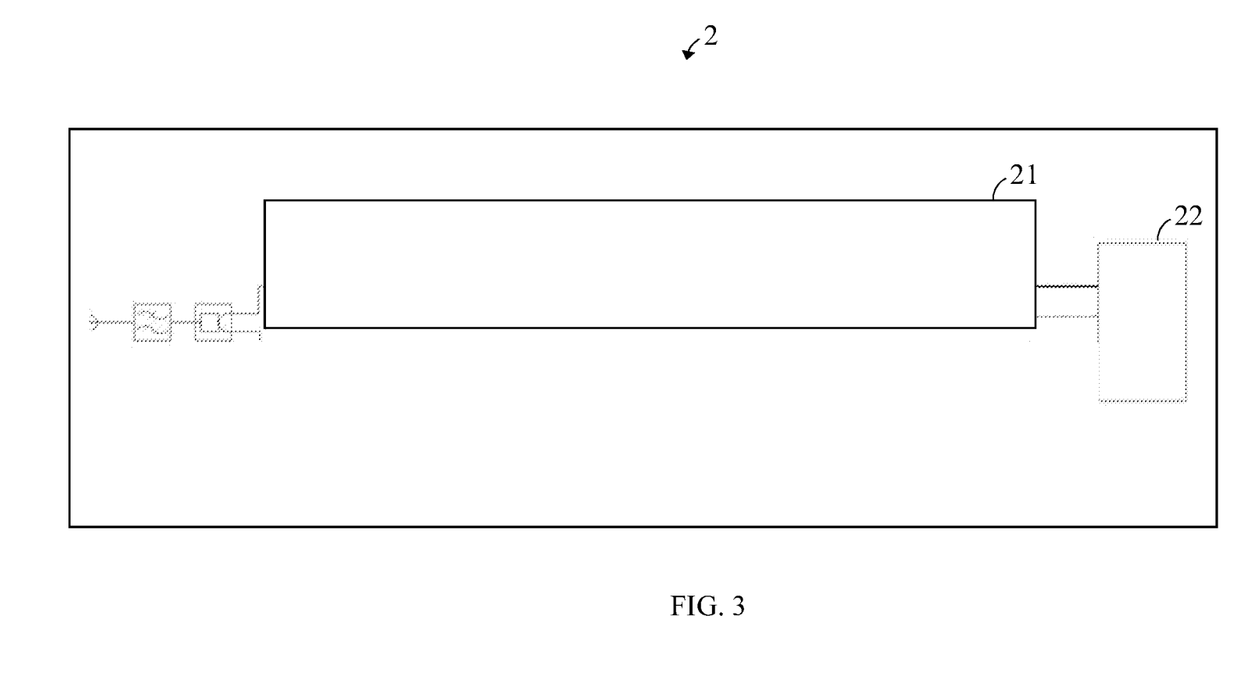
FIG. 3 illustrates an implementation of an RF measurement equipment in accordance with the present disclosure.

FIG. 3 illustrates an implementation of an RF measurement equipment 2 in accordance with the present disclosure.

The RF measurement equipment 2 comprises, in this most generic implementation: an RX chain 21, comprising one or more interposed power-adjusting members 211 (see FIG. 4); and a logic device 22, being configured to measure 11 an EVM of the RX chain 21 in accordance with a TX feedback signal; and further being configured to actuate 13, responsive to the trigger event E, the power-adjusting members 211 in accordance with the measured EVM of the RX chain 21.

The logic device 22 may comprise one of: a digital signal processor, DSP; a field-programmable gate array, FPGA; and an application-specific integrated circuit, ASIC.

Figure 4:
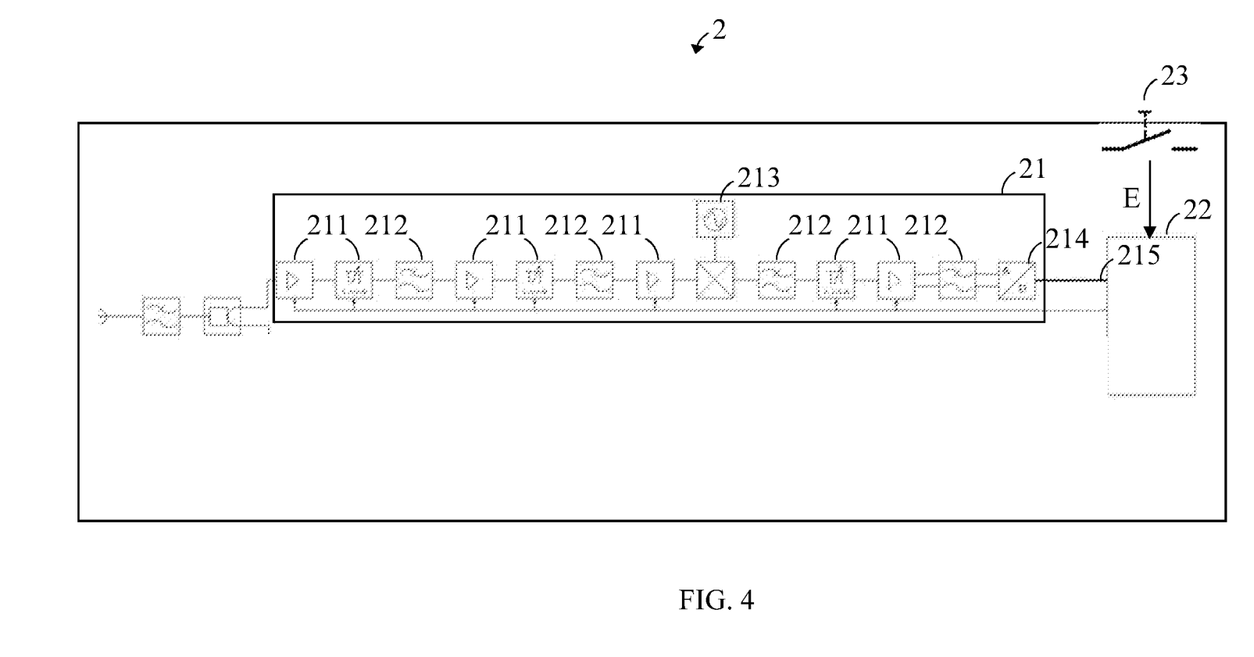
FIG. 4 illustrates the RF measurement equipment of FIG. 3 in more detail.

FIG. 4 illustrates the RF measurement equipment 2 of FIG. 3 in more detail.

The more detailed implementation of FIG. 4 shows further optional specifics of the RX chain 21.

The power-adjusting members 211 of the RX chain 21 may comprise one or more of: an adjustable attenuator; and an adjustable amplifier.

The RX chain 21 may further comprise one or more of: a bandpass filter or preselector 212; a local oscillator 213; an analog-digital converter, ADC 214; and a serial interface 215 between the ADC 214 and the logic device 22 being in accordance with a JESD204 standard, revision B.

The RF measurement equipment 2 may further comprise a user-operable control element 23, being configured to generate the trigger event E responsive to an actuation of the same.

For measuring 11 the EVM of the RX chain 21 in accordance with the TX feedback signal, the logic device 22 may further be configured to continuously measure 111 the EVM of the RX chain 21 in accordance with the TX feedback signal.

Figure 5:
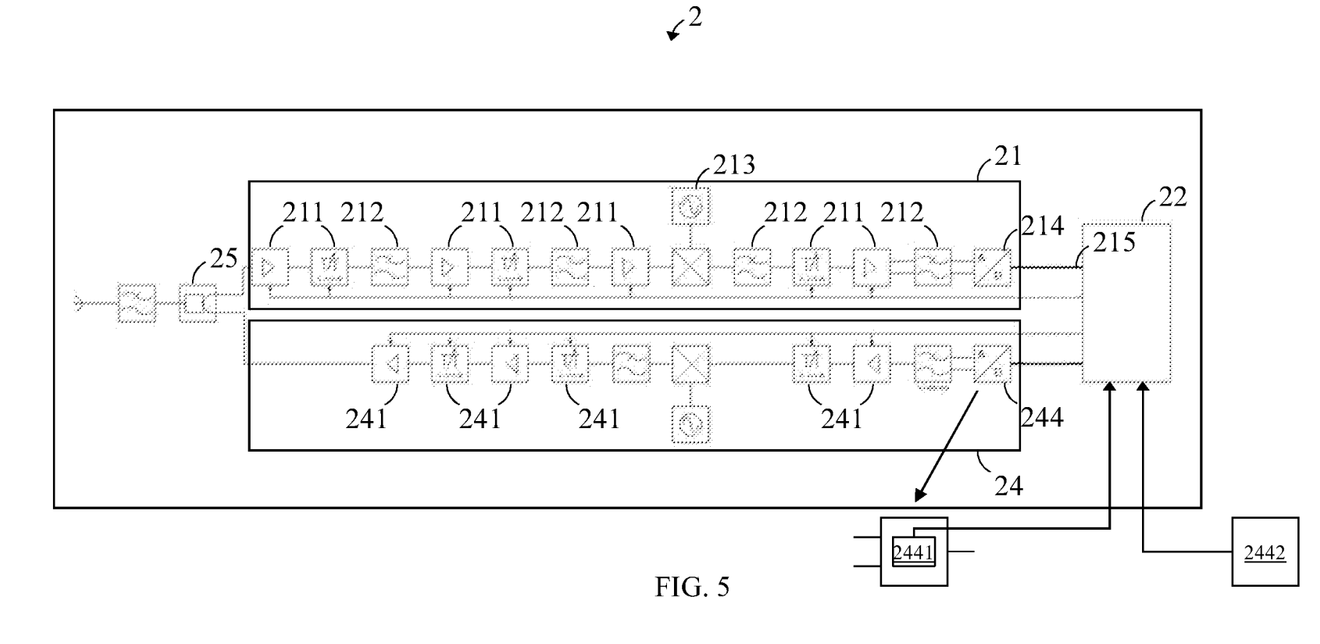
FIG. 5 illustrates another implementation of the RF measurement equipment in accordance with the present disclosure.

For measuring 11 the EVM of the RX chain 21 in accordance with the TX feedback signal, the logic device 22 may further be configured to tap 112 the TX feedback signal from an AWG 2441 of a DAC 244 of a TX chain 24 (see FIG. 5) of the RF measurement equipment 2 or, alternatively, to generate 113 the TX feedback signal by a standalone AWG 2442 (see FIG. 5).

The EVM minimization may thus also be applied to RX-only devices, such as spectrum analyzers, using a TX feedback signal provided by the standalone AWG 2442.

For actuating 13 the power-adjusting members 211 in accordance with the measured EVM of the RX chain 21, the logic device 22 may further be configured to optimize 131 the measured EVM of the RX chain 21 in accordance with an iterative optimization technique or, alternatively, to optimize 132 the measured EVM of the RX chain 21 in accordance with a machine learning technique.

FIG. 5 illustrates another implementation of the RF measurement equipment 2 in accordance with the present disclosure.

The implementation of FIG. 5 shows the optional TX chain 24 as well as further optional specifics of the same.

More specifically, the RF measurement equipment 2 may further comprise: the TX chain 24, comprising one or more further interposed power-adjusting members 241.

The power-adjusting members 241 of the TX chain 24 may comprise one or more of: an adjustable attenuator; and an adjustable amplifier.

The TX chain 24 may further comprise one or more of: a bandpass filter or preselector; a local oscillator; an digital-analog converter, DAC; and a serial interface between the DAC and the logic device 22 being in accordance with a JESD204 standard, revision B.

The RF measurement equipment 2 may further comprise a power-coupling element 25, being configured to provide the TX chain 24 with an RX feedback signal.

The power-coupling element 25 may comprise one of: a power coupler; and a switch.

The logic device 22 may further be configured to measure 12 an EVM of the TX chain 24 in accordance with the RX feedback signal.

For measuring 12 the EVM of the TX chain 24 in accordance with the RX feedback signal, the logic device 22 may further be configured to continuously measure 121 the EVM of the TX chain 24 in accordance with the RX feedback signal.

For measuring 12 the EVM of the TX chain 24 in accordance with the RX feedback signal, the logic device 22 may further be configured to tap 122 the RX feedback signal from an AWG of a DAC 214 of the RX chain 21 of the RF measurement equipment 2 or, alternatively, to generate 123 the RX feedback signal by a standalone AWG.

The logic device 22 may further be configured to actuate 14, responsive to the trigger event E, the further power-adjusting members 241 in accordance with the measured EVM of the TX chain 24.

For actuating 14 the power-adjusting members 241 in accordance with the measured EVM of the TX chain 24, the logic device 22 may further be configured to optimize 141 the measured EVM of the TX chain 24 in accordance with an iterative optimization technique or, alternatively, to optimize 142 the measured EVM of the TX chain 24 in accordance with a machine learning technique.

Applying the EVM minimization to a TX chain 24 may require providing a corresponding RX chain, if none is existing (TX-only).

The invention claimed is:

1. A method of error vector magnitude, EVM, minimization for a radio frequency, RF, measurement equipment, the method comprising
measuring the EVM of a receive, RX, chain of the RF measurement equipment in accordance with a transmit, TX, feedback signal; and
responsive to a trigger event, actuating one or more power-adjusting members interposed in the RX chain in accordance with the measured EVM of the RX chain.

2. The method of claim 1,
wherein measuring the EVM of the RX chain of the RF measurement equipment in accordance with the TX feedback signal comprises
continuously measuring the EVM of the RX chain of the RF measurement equipment in accordance with the TX feedback signal.

3. The method of claim 1,
wherein measuring the EVM of the RX chain of the RF measurement equipment in accordance with the TX feedback signal comprises
tapping the TX feedback signal from an arbitrary waveform generator, AWG, of a digital-analog converter, DAC, of a transmit, TX, chain of the RF measurement equipment.

4. The method of claim 1,
wherein measuring the EVM of the RX chain of the RF measurement equipment in accordance with the TX feedback signal comprises
generating the TX feedback signal by a standalone AWG.

5. The method of claim 1,
the trigger event comprising an actuation of a user-operable control element of the RF measurement equipment.

6. The method of claim 1,
wherein actuating the one or more power-adjusting members interposed in the RX chain in accordance with the measured EVM of the RX chain comprises
optimizing the measured EVM of the RX chain in accordance with an iterative optimization technique.

7. The method of claim 1,
wherein actuating the one or more power-adjusting members interposed in the RX chain in accordance with the measured EVM of the RX chain comprises
optimizing the measured EVM of the RX chain in accordance with a machine learning technique.

8. The method of claim 1, further comprising
measuring the EVM of the TX chain of the RF measurement equipment in accordance with an RX feedback signal; and
responsive to the trigger event, actuating one or more further power-adjusting members interposed in the TX chain in accordance with the measured EVM of the TX chain.

9. The method of claim 1,
the power-adjusting members comprising one or more of:
an adjustable attenuator; and
an adjustable amplifier.

10. A radio-frequency, RF, measurement equipment, comprising
a receive, RX, chain, comprising
one or more interposed power-adjusting members; and
a logic device, being configured to
measure an error vector magnitude, EVM, of the RX chain in accordance with a transmit, TX, feedback signal; and
responsive to a trigger event, actuate the power-adjusting members in accordance with the measured EVM of the RX chain.

11. The RF measurement equipment of claim 10,
wherein for measuring the EVM of the RX chain in accordance with the TX feedback signal, the logic device is further configured to
continuously measure the EVM of the RX chain in accordance with the TX feedback signal.

12. The RF measurement equipment of claim 10,
wherein for measuring the EVM of the RX chain in accordance with the TX feedback signal, the logic device is further configured to
tap the TX feedback signal from an arbitrary waveform generator, AWG, of a digital-analog converter, DAC, of a TX chain of the RF measurement equipment.

13. The RF measurement equipment of claim 10,
wherein for measuring the EVM of the RX chain in accordance with the TX feedback signal, the logic device is further configured to
generate the TX feedback signal by a standalone AWG.

14. The RF measurement equipment of claim 10, further comprising
a user-operable control element, being configured to generate the trigger event responsive to an actuation of the same.

15. The RF measurement equipment of claim 10,
wherein for actuating the power-adjusting members in accordance with the measured EVM of the RX chain, the logic device is further configured to
optimize the measured EVM of the RX chain in accordance with an iterative optimization technique.

16. The RF measurement equipment of claim 10,
wherein for actuating the power-adjusting members in accordance with the measured EVM of the RX chain, the logic device is further configured to
optimize the measured EVM of the RX chain in accordance with a machine learning technique.

17. The RF measurement equipment of claim 10, further comprising
a TX chain, comprising
one or more further interposed power-adjusting members; and
a power-coupling element, being configured to
provide the TX chain with an RX feedback signal; and
the logic device further being configured to
measure an EVM of the TX chain in accordance with the RX feedback signal; and
responsive to the trigger event, actuate the further power-adjusting members in accordance with the measured EVM of the TX chain.

18. The RF measurement equipment of claim 17,
the power-coupling element comprising one of:
a power coupler; and
a switch.

19. The RF measurement equipment of claim 10,
the power-adjusting members comprising one or more of:
an adjustable attenuator; and
an adjustable amplifier; and
the logic device comprising one of:
a digital signal processor, DSP;
a field-programmable gate array, FPGA; and
an application-specific integrated circuit, ASIC.

20. The RF measurement equipment of claim 10,
the RX chain further comprising one or more of:
a bandpass filter or preselector;
a local oscillator;
an analog-digital converter, ADC; and
a serial interface between the ADC and the logic device being in accordance with a JESD204 standard, revision B.

* * * * *